United States Patent Office 3,372,132
Patented Mar. 5, 1968

3,372,132
GRAFT POLYMERS OF CELLULOSE
CRYSTALLITE AGGREGATES
Mamerto M. Cruz, Jr., Newtown Square, Pa., assignor to FMC Corporation, Philadelphia, Pa., a corporation of Delaware
No Drawing. Continuation-in-part of application Ser. No. 112,152, May 3, 1961. This application May 6, 1964, Ser. No. 365,508
14 Claims. (Cl. 260—17.4)

ABSTRACT OF THE DISCLOSURE

A free-flowing, particulate, sand-like graft copolymer of crystalline cellulose is formed by reacting cellulose crystallite aggregates having a level-off D.P. with a polymerizable monomer containing a doubly bonded methylene group. When molded by heat and pressure, the copolymer forms electrical insulators with excellent resistance to high humidity conditions. Translucent films are formed by dispersing the graft polymer in a non-solvent liquid and evaporating the liquid.

This application is a continuation-in-part of application Ser. No. 112,152, filed May 3, 1961, now abandoned.

This invention relates to graft polymers of cellulose crystallite aggregates having a level-off D.P. (degree of polymerization) and particularly to inter-reaction products of said aggregates with monomers containing a doubly bonded methylene group, that is, with polymerizable compounds containing the vinylidene ($CH_2=C=$) group and/or the vinyl ($CH_2=CH-$) group.

While the products have general utility, they are particularly useful in electrical applications as insulating materials wherever there is a requirement for materials having a low dielectric constant and a low dissipation factor. The products are further characterized by being moldable to any suitable shape. In these respects, they are at least comparable, and frequently superior, to so-called vulcanized fiber, a widely used insulating material which, however, is tedious and expensive to produce, and is not moldable, requiring precise, time-consuming and expensive machining operations to fit it to given applications.

Other advantages will become apparent as the description proceeds.

Considering the reactants in detail, cellulose crystallite aggregates are acid-insoluble products produced by a controlled acid hydrolysis of cellulose and their having a level-off D.P. reflects a destruction of the original fibrous structure of the cellulosic source material. The term "level-off D.P." has reference to the average level-off degree of polymerization measured in accordance with the paper by O. A. Battista entitled, "Hydrolysis and Crystallization of Cellulose," vol. 42, Industrial and Engineering Chemistry, pages 502–7 (1950). A method of forming cellulose crystallite aggregates having a level-off D.P. and a method of disintegrating the aggregates to reduce a mass of aggregates to a colloid-forming size are described in United States Patent 2,978,446, dated Apr. 4, 1961.

The cellulose crystallite aggregates, or level-off D.P. cellulose, suitable for making derivatives is characterized by having an average level-off D.P. of about 15 to 375 anhydroglucose units. Preferred sources for making the cellulose crystallite aggregates include cotton linters and wood pulp having a high alpha-cellulose content. Other sources include alkali swollen forms of natural cellulose, such as, for example, cellulose that has been mercerized by treatment with 18% caustic soda solution at 20° C. for two hours, and regenerated forms of cellulose, including tire and textile yarns, fibers and cellophane.

It may be observed that "crystallite," as used herein, is a cluster of longitudinally disposed, closely packed cellulose chains or molecules, and that "aggregates" are clusters of crystallites. The aggregates may also be said to comprise straight, rigid, relatively non-twistable groups of linear chains. Of interest is the fact that the chains produced by the hydrolysis, regardless of their average level-off D.P. value, each have on one end thereof a potential aldehyde group, such group being in the 1 carbon position of an end anhydroglucose unit and requiring the assistance of the ring oxygen atom, which is ortho to it, to realize its aldehydic potential. The group has the reducing properties of an aldehyde group. On their other ends, the chains have only hydroxyls as functional groups.

The as-formed aggregates are further characterized by having a particle size in the over-all range of 1 or 2 to 250 to 300 microns, as determined visibly by microscopic examination. If the foregoing product is subjected to mechanical disintegration, there is produced a material having a size in the over-all range of less than 1 to about 250 or 300 microns, and as will be understood, the proportions of material in the lower size ranges will be increased over those of the non-disintegrated aggregates. It will also be understood that the particle size and size distribution may be selected to suit a particular use.

Fractionation of the attrited products, if desired, may be accomplished by means of such separation procedures as mechanical sifting, settling in water, or centrifuging, a number of useful fractions being obtainable, including fractions having a particle size of up to 0.2, 1, 2, 5, or even 10 microns. Preferably, each dimension of the particles should be within the size range noted for each fraction; however, particles, having two dimensions within the size range are quite useful, as are particles having but one dimension within the size range although they are less preferred.

For preparing the graft polymers, the starting aggregates may be of any desired size or size range, although it is preferred that they shall have a particle size of 5 microns or less, whether or not they have been attrited. As the production of particle sizes of 5 microns or less is favored by attrition, it may be desirable to carry out such step, or even to grind in the dry state, and if necessary, to resort to fractionation to obtain the desired sizes. It will also be apparent that particle sizes of 5 microns or less can be obtained by fractionating the non-attrited aggregates, although the yield may be less. In general, the starting aggregates may be in the wet or dry state, attrited or not. If attrited, it is convenient to take the attrited aggregates in the gel form and to dilute the gel with water to a desired concentration.

During the acid hydrolysis of the original cellulosic material to form uniform chain lengths of cellulose crystallites, each chain so formed has a potential aldehyde group on one end. If desired, the starting crystallites may be treated with a reducing agent, such as sodium borohydride, to reduce the potential aldehyde groups to hydroxyl; such end anhydroglucose units of the crystallites then have a total of four hydroxy groups available for reaction, rather than the usual three. The borohydride may be added in successive small amounts to an aqueous dispersion of the crystallites, the temperature being kept at or near room temperature, and then further addition of the borohydride does not produce a rise in temperature, the reaction may be considered to be completed and any excess reagent may be destroyed as by addition of acid. Other useful reducing agents are alkali borohydrides such as those of potassium and lithium, aluminum alkoxides and also the alkoxides of sodium, magnesium, zirconium and tin, these alkoxides usually being employed in alcoholic solution. Aluminum isopropoxide in isopropanol and aluminum ethoxide in ethanol are useful reducing agents.

Still other agents include alkoxy magnesium halides, lithium aluminum hydride, sodium and sodium amalgam, aluminum amalgam, zinc dust plus acetic acid, etc.

Instead of reducing the end aldehydic groups as described, they may be oxidized to carboxyl, thereby placing carboxyl groups in the 1 position of the above-described end anhydroglucose units of the crystallites. The oxidizing step may suitably be performed by adding hydrogen peroxide to an aqueous dispersion of the crystallites, then adding caustic soda to catalyze the decomposition of the peroxide, and thereafter heating the mixture for several hours at or near 100° C. Another useful agent is sodium hypochlorite, which is mixed with the crystallites at room temperature, the pH then being adjusted to 7, and after standing several hours, the solution is filtered. Other useful oxidizing agents include calcium hypochlorite, nitrogen dioxide, chromic acid, permanganate, etc.

Whether the chains of the crystallites are reduced or oxidized as described, it will be understood that the resulting product is broadly included by the expression "cellulose crystallite aggregates"; however, an appropriate modifying expression such as "reduced" or "oxidized" will be used to identify the particular products.

As indicated, the polymerizable compounds or monomers are those containing the vinyl group and/or the vinylidene group. These compounds are characterized by being reactive with the cellulose crystallite aggregates and by being polymerizably reactive; in other words, the compound adds on to the aggregates and polymerizes, the net effect being to connect a synthetic polymeric side chain to an anhydroglucose unit of the aggregates. More specifically, the following polymerizable compounds or monomers are satisfactory: acrylic compounds, such as acrylic acid and its homologs such as the alkyl acrylic acids wherein the alkyl group may have up to 12, or more carbon atoms, preferably 1 to 6 carbon atoms; also halogen-substituted acrylic acids. Also derivatives of the foregoing acrylic acid series or group, including the anhydrides, amides, nitriles, and esters. Amides include acrylamide, methacrylamide, ethacrylamide, methylene bisacrylamide, etc., and nitriles include acrylonitrile, methacrylonitrile, ethacrylonitrile, alpha-chloro-acrylonitrile, etc. Satisfactory esters are those of monohydric lower molecular weight alcohols having 1 to 10 carbon atoms, such as methyl acrylate, butyl acrylate, decyl acrylate, hexyl methacrylate, etc.; also esters of nitroalcohols such as 3-nitro-2-butanol, 2-nitro-3-hexanol, 2-methyl-2-nitro-1-butanol, 2-nitro-2-methylpropyl alcohol, and various other nitropropanols, nitro-butanols, nitro-pentanols, nitro-hexanols, and the like with acrylic acid and alkyl acrylic acids; also esters of such polyhydric alcohols as ethylene glycol, propylene glycol, diethylene glycol, glycerol, etc., pentaerythritol, dipentaerythritol, dipropylene glycol, and including partially esterified polyhydric alcohols with acrylic acid and alkyl acrylic acids. Other satisfactory polymerizable monomers are dienes or diolefins like butadiene, isoprene, pentadiene, hexadiene, 2,3-dimethylbutadiene-1,3, diisobutenyl, allene; also halogenated diene derivatives like chloroprene. Also satisfactory are allyl compounds such as allyl alcohol, allyl esters, alkyl-substituted allyl alcohols and esters, and including allyl acetate, allyl chloroacetate, allyl caproate, allyl benzoate, allyl linoleate, allyl acrylate, allyl propionate, allyl butyrate, allyl isobutyrate, diallyl carbonate, diallyl oxalate, diallyl phthalate, diallyl maleate, triallyl cyanurate; also the allyl carbinol; methallyl aceate, and the like. Also vinyl or vinylidene esters such as vinyl acetate, vinyl propionate, vinyl butyrate, vinyl chloride, vinylidene chloride, etc. Vinyl ethers are siutable, such as vinylethylether, vinyl-propylether, etc. Other vinyl compounds are methylvinylcarbinol, divinylsulfone, divinylsulfide, vinyl pyridine and the like. Still other polymerizable compounds are styrene and substituted styrenes, either ring-substituted or side chain-substituted styrenes, and including alpha-chlorostyrene, the alkyl-substituted styrenes like the methyl-, dimethyl-, and trimethylstyrenes, ethylstyrenes, isopropylstyrenes, halogenated styrenes like the bromostyrenes, chlorostyrenes, bromethylstyrenes, dichlorostyrenes, etc.

In the foregoing enumeration, the compounds have not been separated with respect to the vinyl group or vinylidene group. It will be noted that the enumerated compounds include isoprene and chloroprene which may be considered as containing both a vinyl group and a vinylidene group.

Two or more different polymerizable compounds may be employed in the reaction, and there may be monomers, or a mixture of a monomer and the dimer thereof.

The polymerizable compound is reacted with the cellulose crystallite aggregates in an aqueous medium at a pH of less than 5, preferably less than 3.5 or 4, and in the presence of a catalyst comprising an ionizable ceric salt which is soluble in the water or in one of the other components of the reaction mixture.

Suitable ionizable ceric salts are ceric nitrate, ceric sulfate, ceric iodate, ceric ammonium nitrate, ceric ammonium sulfate, ceric ammonium pyrophosphate, and ceric salts of organic acids, such as cerium stearate, cerium naphthanate, cerium oleate, cerium linoleate, and the like. Also suitable are ceric compounds capable of forming ceric salts in situ under the conditions of the reaction, such as ceric oxide and hydroxide. Organic as well as inorganic salts are suitable, particularly salts of organic sulfur-containing acids which may be monobasic or polybasic, saturated or unsaturated, aliphatic or aromatic acids. Illustrative sulfocarboxylic acids are the mono- and disulfosuccinic acids, sulfochlorsuccinic acid, sulfoadipic acid, sulfopyrotartaric acid, sulfoglutaric acid, sulfosuberic acid, sulfosebacic acid, sulfomaleic acid, sulfofumaric acid, sulfodimethyl succinic acid, sulfomethylglutaric acid, sulfomalonic acid, sulfopropylsuccinic acid, sulfooctyglutaric acid, etc. In order to prepare these ceric salts, an inorganic ceric salt such as ceric ammonium nitrate may be reacted with the organic sulfur-containing acid. If desired, the inorganic ceric salt may be reacted with lower alkyl esters of the foregoing acids, or with monoalkyl esters of sulfuric acid, or with alkyl benzene sulfonates or alkyl naphthalene sulfonates, These organic ceric compounds, which are usually salts but which may be complexes, are soluble in oil.

The amount of ceric compound is variable, ranging from as low as 0.000002 to 0.2 part by weight of ceric ion per part by weight of polymerizable compound, and preferably from 0.002 to 0.02 part of ceric ion per part of polymerizable compound.

The preferred pH is 1 to 2, but as indicated, may be as high as 3.5 or 4, and, less preferably, as high as 5. The pH of the reaction mixture is suitably adjusted or controlled by means of nitric acid. The concentration of acid should be sufficient to bring the pH of the reaction mixture to the desired value. The acid also helps liberate ceric ion from the ceric salt. Besides nitric acid, any suitable conventional inorganic or organic acid may be used, such as hydrochloric, sulfuric, phosphoric, acetic, or other acids.

The reaction may be carried out at temperatures from 0° C., or slightly below 0°, to 100° C., but preferably at temperatures of 10 to 60° C. Pressures are preferably atmospheric, although a partial vacuum is useful.

The amount of aggregates per part by weight of polymerizable compound is variable over a wide range but preferably is 0.1 to 2 or 3 parts; it may extend from 0.01 to as high as 100 parts.

Any suitable amount of water may be used. It serves as a solvent for the ceric salt, and also helps to disperse the aggregates and the other ingredients of the reaction mixture. It may further serve as a control agent for the reaction rate, larger amounts acting to slow down the rate and vice versa. The amount of water is at least sufficient to dissolve the ceric salt, and preferably more than this amount is used in order to carry out the other purposes noted.

Besides ceric salts, other suitable catalysts are benzoyl peroxide, persulfate salts such as ammonium persulfate, and ferrous sulfate plus hydrogen peroxide in combination.

As will be apparent, the graft polymers comprise the reaction product of the crystallite aggregates and the polymerizable compound or monomer. The content of these reactants in the graft is variable; thus, the aggregates content may vary from 5 to 95%, but preferably from 15 to 65% by weight, the balance of the graft comprising the reacted monomer. A more preferred graft polymer is one comprising 30 to 40% by weight of reacted aggregates and the balance reacted monomer; such a graft, where the monomer is acrylonitrile, has quite valuable electrical properties, as shown in Example 2 below. The graft polymers comprise free-flowing, particulate, sand-like solids that are generally light in color. These polymers are compression moldable within a few minutes to any suitable shape and size, the pressure being variable from 5,000 p.s.i. to any desirable upper limit, and the temperature from 400° F. or more down to room temperature. These variable molding conditions show that precise control over the temperature, pressure, and time is not required. The polymers do not have melting points but are flowable under suitable conditions of heat and pressure, as obtained during molding. A further advantage of the graft polymers is their light color which enables them to receive coloring agents of both light and dark hues. Test discs molded from the polymers at 18,000 p.s.i. and 350° F. showed very low moisture pick-up; at 58% RH and room temperature the pick-up may be as low as 0.1 to 0.5% by weight, while after immersion in boiling water for 3 hours the pick-up is no higher than about 2%. These discs, as shown in the examples below, exhibit a DC (dielectric constant) of 3 to 5 and a DF (dissipation factor) of 0.003 to 0.02 at 58% RH (relative humidity) and room temperature. At 97 to 100% RH and room temperature, the DC is 4 to 12, usually less than 10, and the DF is 0.009 to 0.12.

The graft polymers are generally useful as insulating materials, and especially where high dielectric strength and resistance to humid atmospheres are prime considerations. For example, they are suitable for the manufacture of printed circuits where they provide increased safety because, while the polymers can burn, they do so without flame propagation, i.e., they simply char without being penetrated or burned through, and thus provide protection against direct contact by flame. Furthermore, useful molded articles in general can be made, such as dinnerware, which are moisture-, stain- and impact-resistant.

The invention may be illustrated by the following examples.

*Example 1*

Cellulose crystallite aggregates were prepared by hydrolyzing purified sulfite wood pulp with 0.5% by weight of HCl for 60 minutes at 250° F. After washing, the aggregates were spray dried to give a dry powder having a moisture content of 5% by weight, an average level-off D.P. of 220, and a particle size ranging from 1 to 250 or 300 microns.

Then 50 g. of the aggregates were dispersed in one liter of water by means of a laboratory mixer having a propeller type mixing blade in the presence of small amounts of Dry Ice. As the latter sublimed, the carbon dioxide gas served to flush out oxygen from the water, so as to minimize the formation of a homopolymer. After 5 minutes of stirring, 5.5 g. of ceric ammonium nitrate and 6.4 ml. of 70% aqueous nitric acid were added with stirring; and then after 10 minutes, 300 ml. of acrylonitrile were added with constant stirring and in the presence of Dry Ice. The exothermic reaction was allowed to continue for 5 minutes, at the end of which time the temperature reached 65° C. The reaction mass was then filtered, washed with dilute (0.1%) HCl solution and then with water until acid free. The graft polymer product, identified as Sample No. 185, was a solid particulate material having a sand-like appearance and feel. The yield was 170 g. or 340% based on the aggregates. The graft comprised 67% of acrylonitrile and 33% of the aggregates. The nitrogen content of the product was 17.7% by weight.

Another graft polymer, identified as Sample No. 189, was prepared in the same way except that 100 g. of the aggregates, 120 ml. of acrylonitrile, and 5 g. of ceric ammonium nitrate were used, the other ingredients being the same as before. The reaction time was 1.5 hours and the final temperature of the reaction mass was 35° C. A yield of 156 g. of product was obtained, or 156% based on the aggregates. The product comprised 35.5% of acrylonitrile and 64.5% of aggregates. The product had a nitrogen content of 9.4%.

A number of discs were pressed from each of the foregoing products, the discs being 2¼ inches in diameter and 120 mils thick and being made from 10 g. of graft polymer. The discs were pressed in conventional molds over a 15 minute period at a pressure of 18,000 p.s.i. The molds were equipped with heating means. Some of the discs were pressed in the cold, i.e., at room temperature, and some at 302° F. All of the resulting hot pressed discs were translucent. The dielectric constant and the dissipation factor of the discs were measured at room conditions (relative humidity of 30 to 40%), then after heating the discs at 65° C. in an oven for 21 hours to cure the same, again after heating fresh discs at 150° C. for 22 hours, and again after immersing the last-mentioned discs in water for 30 hours (RH of 100%). After the water immersion treatment, the discs showed a water pick-up of less than 0.5%. The electrical tests were made at 1000 c.p.s. with an Impedance Bridge, Model 250–DF, manufactured by Electro Measurement Inc., while the discs were held in a Vernier Capacitor dielectric sample holder, type 1690–A, made by General Radio Co. The tests may be summarized in the following table.

TABLE 1

| Sample No. | Nitrogen Content, percent | Disc Molding Conditions | | Electrical Properties | | | | | | | |
|---|---|---|---|---|---|---|---|---|---|---|---|
| | | Temp., ° F. | Time, min. | Room Conditions | | After Curing at 65° C. | | After Curing at 150° C. | | After 30 hrs. in water | |
| | | | | DC | DF | DC | DF | DC | DF | DC | DF |
| 185 | 17.7 | Room | 15 | 3.0 | 0.003 | 3.5 | 0.004 | 3.2 | 0.004 | | |
| 185 | 17.7 | 302 | 15 | 5.5 | .02 | | | | | 5.4 | 0.19 |
| 189 | 9.4 | Room | 15 | 4.1 | .004 | 3.7 | .004 | 3.5 | .004 | | |
| 189 | 9.4 | 302 | 15 | 5.2 | .008 | | | | | 5.9 | 0.16 |

*Example 2*

Using the cellulose crystallite aggregates as prepared in Example 1, a graft polymer, identified as No. 1492–23, was made as described in such example except that the quantities of the reactants were as follows: 500 g. of aggregates, 55 g. of ceric salt, 64 ml. of 70% nitric acid, 10 liters of water, and 2,000 ml. of acrylonitrile. The reaction was allowed to continue for 1.5 hours, the final temperature reaching 43° C. After filtration, the product was washed with isopropanol to remove any unreacted acrylonitrile and then it was washed with water and dilute HCl. As in Example 1, the product had a light yellow color and a sand-like appearance. Its bulk density was 17.6 lbs./cu. ft. The yield of product was 274%, or 1371 g., of which 34.6% comprised crystallite aggregates and the balance acrylonitrile. The nitrogen content was 17.2%.

Another graft, identified as No. 1492-25, was made using the foregoing procedure except that 1000 g. of aggregates and 1280 ml. of acrylonitrile were employed. The resulting product was obtained in a yield of 191% or 1914 g., and had an aggregates content of 52.3%, an acrylonitrile content of 47.7%, and a nitrogen content 12.4%.

A third graft polymer, identified as No. 1492-30, was made using the same ingredients and concentrations as in the preceding paragraph, except that the aggregates were first soaked in the acrylonitrile for 1 hour at room temperature, after which the mixture was added to the water containing the ceric salt in the presence of chunks of Dry Ice to prevent homopolymerization. The temperature reached 49° C. after 5 minutes of vigorous agitation and remained there for 1.5 hours after which the reaction was terminated by filtering the reaction mixture and washing the product as described above. A yield of 187.5%, or 1975 g. was obtained, which represented 53.3% of the aggregates and 46.7% of nitrile. The produce had a nitrogen content of 12.4%.

Translucent discs were made up as described in Example 1, and their electrical properties tested at various RH levels. The data is in Table 2.

was 8.4%. The aggregates content of the product was 59.8% and the nitrile content 40.2%.

A number of discs were pressed from this graft for electrical testing. The results are as follows:

TABLE 4

| Sample No. | Disc Molding Conditions | | Electrical Properties | | | | | |
|---|---|---|---|---|---|---|---|---|
| | Temp., ° F. | Time, min. | Room Conditions | | After 6 hrs. in water | | After 90 hrs. in water | |
| | | | DC | DF | DC | DF | DC | DF |
| 1 | 325 | 15 | 4.2 | .004 | 4.7 | .015 | 10.6 | .12 |
| 2 | 350 | 15 | 4.8 | .007 | 5.2 | .014 | 12.0 | .12 |
| 3 | 325 | 20 | 5.0 | .003 | 5.1 | .014 | 11.3 | .12 |
| 4 | 325 | 30 | 4.3 | .005 | 4.9 | .013 | 10.7 | .11 |

*Example 5*

Purified sulfite wood pulp in an amount of 35 lb. was mixed with 4 lb., 3 oz. of HCl and 315 lbs. of water, and the mass subjected to hydrolysis for 1 hour at 250–260° F. The resulting aggregates had a level-off D.P. of 240. They were washed 3 times with water, then diluted 20:1 with water after which 1 lb. of sodium borohydride was added and the mass stirred at room temperature for 2 hours, the pH first being raised with sodium borate to a level of 9.5–10. The material was then washed with water, neu-

TABLE 2

| Sample No. | Percent N | Disc Molding Conditions | | Electrical Properties | | | | | | Water Pick-Up, 58% RH, Percent |
|---|---|---|---|---|---|---|---|---|---|---|
| | | Temp., ° F. | Time, min. | Room Conditions | | 58% RH | | 97% RH | | |
| | | | | DC | DF | DC | DF | DC | DF | |
| 1492-30 | 12.4 | 325 | 15 | 5.1 | .009 | 5.1 | .010 | 5.4 | .013 | .2 |
| 1492-25 | 12.4 | 350 | 20 | 5.0 | .010 | 5.1 | .010 | 5.4 | .014 | .1 |
| 1492-25 | 12.4 | 350 | 15 | 5.3 | .011 | 5.4 | .012 | 5.7 | .015 | .1 |
| 1492-25 | 12.4 | 325 | 20 | 5.2 | .009 | 5.3 | .009 | 5.5 | .013 | .2 |
| 1492-25 | 12.4 | 325 | 15 | 5.1 | .009 | 4.9 | .008 | 5.6 | .014 | .2 |
| 1492-23 | 17.2 | 350 | 20 | 4.6 | .008 | 4.6 | .009 | 4.8 | .010 | .1 |
| 1492-23 | 17.2 | 350 | 15 | 4.6 | .008 | 4.5 | .008 | 4.9 | .010 | .5 |
| 1492-23 | 17.2 | 325 | 15 | 4.5 | .008 | 4.4 | .008 | 4.7 | .009 | .5 |
| 1492-23 | 17.2 | 325 | 20 | 4.5 | .008 | 4.4 | .008 | 4.7 | .009 | .1 |

*Example 3*

A series of disc corresponding to Sample No. 1492-23 of Example 2 were subjected to boiling water for 3 hours and then immediately tested in regard to their electrical properties and water pick-up. The data is as follows:

TABLE 3

| Sample No. | Nitrogen Content, Percent | Disc Molding Conditions | | Electrical Properties After 3 Hours in Boiling Water | | Water Pick-up After 3 hours in Boiling Water, Percent |
|---|---|---|---|---|---|---|
| | | Temp., ° F. | Time, min. | DC | DF | |
| 1492-23 | 17.2 | 350 | 20 | 7.4 | .042 | 1.0 |
| 1492-23 | 17.2 | 350 | 15 | 8.0 | .045 | 1.7 |
| 1492-23 | 17.2 | 325 | 15 | 7.6 | .045 | 1.0 |
| 1492-23 | 17.2 | 325 | 20 | 7.3 | .041 | 1.8 |

*Example 4*

A methacrylonitrile graft ploymer was made by reacting 50 g. of the aggregates with 300 g. of methylacrylonitrile in the presence of 5 g. of the ceric salt, 6 ml. of 70% nitric acid and 1 liter of water. The aggregates were mixed for 5 minutes with the water, ceric salt, and nitric acid, after which Dry Ice was added. Then the nitrile was added slowly for 10 minutes and the mixture stirred for 3 hours at room temperature. As the reaction appeared to proceed slowly, the temperature was raised to 45° C. and the mixture stirred for 1.5 hours. The resulting product was washed as in Example 1. It was much lighter in color than the other products but still retained the sand-like appearance. The yield of product was 85 g., or 170% based on the aggregates, and the nitrogen content tralized with HCl, and spray dried to a water content of about 2%.

Then following the procedure described in Example 1, 500 g. of the foregoing reduced aggregates, 10 liters of water, 55 g. of ceric ammonium nitrate, 64 ml. of 70% nitric acid and 2,000 ml. of acrylonitrile were reacted over a period of 1.5 hours, using dry ice and constant stirring. The reaction product, identified as No. 1492-88, was washed as in Example 1. The yield was 1785 g. or 357%. About 28% of the product comprised the reduced aggregates. Translucent test discs were made by pressing at 18,000 p.s.i. and 350° F. for 15 minutes, and these were found to exhibit a DC of 4.3 and DF of 0.008 at 58% RH and room temperature, a DC of 4.7 and DF of 0.012 at 97% RH and room temperature, and a DC of 5.4 and DF of 0.026 after 3 hours in boiling water.

Some advantages of the graft polymers over vulcanized fiber have already been noted in connection with the use of these materials as electrical insulators. Of interest in this connection is the fact that a disc of commercial vulcanized fiber had a DC of 5.5 and DF of 0.122 at 57% RH, and a DC of 8.1 and DF of 0.143 at 97% RH, all measurements at room temperature; whereas all the discs of Example 2 had superior properties. Also, the graft polymer identified as No. 1492-23 in Example 2 picks up only 1 to 2% by weight of moisture after being immersed in boiling water for 3 hrs., whereas under the same conditions, vulcanized fiber picks up 7.4% of moisture. Furthermore, vulcanized fiber is observed to swell more in boiling water, the disc thickness increasing by 5.5% as against 1% for the above noted Sample No. 1492-23.

Another advantage of the graft polymer materials is that they are obtainable in a translucent state, and can thus be colored to any suitable shade, whereas vulcanized fiber is not translucent and is available only in darker colors.

Of further interest is the fact that a graft polymer such as the above-described acrylonitrile-aggregates graft is superior both to polymerized acrylonitrile and the aggregates per se. Polyacrylonitrile is a brittle plastic of low impact strength and inferior molding qualities. Discs made of polyacrylonitrile undergo a color change after immersion in boiling water, and specifically, they lose their original amber color and translucency, becoming opaque and acquiring an undesirable mottled, uneven, darkly grayish hue, indicating the occurrence of degradation. Discs of the graft polymer, when tested in the same way, retain their original amber color and translucency. Discs made from the aggregates per se tend to be water sensitive and to break down at the higher humidities.

For molding purposes, plasticizes may be incorporated with the graft polymers, if desired, to increase the flow of material during molding. These plasticizers suitably comprise graft polymers made by reacting one or more of the above described polymerizable compounds or monomers with a polymerizably reactive polyol capable of forming a graft polymer. The polyol may be cellulose crystallite aggregates having an average level-off D.P. of less than about 50; or it may be a carbohydrate, including polysaccharides like the dextrins, starches, celluloses, and hemicelluloses, tetrasaccharides like lupeose; trisaccharides like raffinose; disaccharides like lactose, maltose, and sucrose; and monosaccharides such as the bioses, trioses, tetroses, pentoses, hexoses, and heptoses. The starches include fractions thereof such as amylose, amylopectin, high amylose fractions, and high amylopectin fractions. The monosaccharides include sugars such as arabinose, ribose, xylose, rhamnose, mannose, glucose, galactose, fructose, sorbose, etc. Oligosaccharides, which include the di-, tri-, and tetrasaccharides, are particularly suitable. Other polyols are the polyhydric alcohols, including alkylene glycols having 2 to 6 or more carbon atoms, such as ethylene glycol; the trihydric alcohols like glycerol; the tetrahydric alcohols like erythritol and pentaerythritol; the pentahydric alcohols like arabitol; and the hexahydric alcohols like mannitol and sorbitol. Other polyols are the polyhydric acids such as tartaric acid, glyceric acid, quinic acid, and the like. Still other polyols are polyoxyethylene glycol, polyoxypropylene glycol, and polyoxyalkylene glycols in general. These plasticizer graft polymers may be prepared separately and mixed with the aggregates graft polymers, or preferably, the polyol can be mixed with the aggregates and grafts of both materials prepared simultaneously. As an example, a mixture comprising 40% by weight of conventional starch and 60% of the aggregates, when reacted with acrylonitrile, gave a product having good eletcrical properties and improved flow. In the plasticizer graft, it is preferred that at least 30% and up to 50 or 60% of such graft shall comprise reacted polyol. It will be understood, in this connection, that conventional amounts of the plasticizing material may be used, say from 1 to 50% by weight by the molding material, the latter being a mixture of the aggregates graft polymer and the plasticizer graft polymer.

Graft polymers prepared from cellulose crystallite aggregates have properties and characteristics which distinguish them from graft polymers formed from fibrous cellulose. The following example illustrates a characteristic which readily distinguishes the two different types of graft polymers:

*Example 6*

Cellulose crystallite aggregates were prepared by hydrolyzing a purified sulfite wood pulp with 0.5% by weight of hydrochloric acid for 60 minutes at 250° F. under pressure. The insoluble residue was recovered, washed free of acid, then slurried in water and spray dried yielding cellulose crystallite aggregates having an average level-off D.P. of approximately 220, a moisture content of 5% and having a particle size range from 1 to about 300 microns. A finely divided purified wood pulp product was obtained being available commercially under the trade name "Solka Floc." This material has a particle size range from about 40 microns to about 145 microns.

In preparing the graft polymer from the cellulose crystallite aggregates, 500 grams of the aggregates were dispersed in 10 liters of water and small amounts of solid carbon dioxide (Dry Ice) added during the dispersion and also during the subsequent reaction period. The carbon dioxide sublimes and serves to remove oxygen from the water and in the subsequent reaction minimizes the formation of a homopolymer of acrylonitrile which is added later. Fifty-five grams of ceric ammonium nitrate and 6.4 ml. of concentrated nitric acid (70% $HNO_3$) were added and mixing continued for about 10 minutes. Two liters of acrylonitrile were added over a period of about 15 minutes and the reaction was continued for about 1.5 hours with constant agitation. The liquid was then removed by filtration and the filtrate was washed with water twice, each time the filtrate being dispersed in water and the water removed by filtration. The filtrate was then washed in a similar manner three times with a mixture of equal parts by volume of isopropanol and hydrochloric acid solution. Subsequently, the filtrate was washed with water until acid free and the product air dried. The product consisted of about 65% acrylonitrile and 35% celluuose crystallite aggregates and had a nitrogen content of 18.5%.

Ten grams of the resulting product were dispersed in 185 ml. of dimethylformamide to form a gelatinous mass which was subsequently spread as a thin film on glass. On drying, a transparent, slightly cloudy film was produced.

In a similar manner, a graft polymer of the finely divided purified wood pulp and acrylonitrile was prepared by dispersing 100 grams of the powdered pulp in two liters of water. Small amounts of solid carbon dioxide were added as described above. Eleven grams of cerium ammonium nitrate and 12.8 ml. of a nitric acid solution (70% $HNO_3$) were added with constant stirring. Four hundred ml. of acrylonitrile were added slowly. In about one-half hour, the reaction mass congealed and another 0.5 liter of water was added and the reaction allowed to continue for an additional one hour period. The liquid was then removed by filtration and the residue washed and dried in exactly the same manner as described in connection with the preparation of the cellulose crystallite aggregate graft polymer. The product consisted of about 65% acrylonitrile and 35% pulp and had a nitrogen content of 18.2%.

Ten grams of this product were dispersed in 185 ml. of dimethylformamide and formed a gelatinous mass. This mass was spread as a thin film on glass. On drying, the film produced was a decidedly white opaque film as compared to the film prepared from the cellulose crystallite aggregate product.

The term "crystalline cellulose" is used herein and in the claims to designate cellulose which is free of amorphous cellulose and is obtained by the degradation of native and regenerated forms of cellulose where the degree of degradation is sufficient so as to remove all amorphous cellulose and to lower the D.P. (degree of polymerization) to at least the level-off D.P. of the cellulose raw material.

The crystalline cellulose graft copolymers of this invention are unique in comparison to like graft copolymers of all other forms of cellulose. One of the distinguishing differences is that the crystalline cellulose graft copolymers are free-flowing, particulate, hard and grainy resembling fine sand whereas graft copolymers of other forms of cellulose are fibrous and bulky or fluffy. Another most unique and distinguishing property is the behavior of the crystalline cellulose graft copolymers in forming films from dispersions. Example 6 illustrates the typical film formation of the crystalline cellulose graft copolymers and of the fibrous cellulose graft copolymers; that is, films formed by drying dispersions of the crystalline cellulose graft copolymers are transparent, slightly cloudy or slightly translucent whereas the films formed by drying dispersions of like fibrous cellulose graft copolymers are opaque. This is based upon films having a thickness of several mils and formed from dispersions containing about 5% of the graft copolymer based upon the weight of the dispersion. The dispersion is in a non-solvent liquid media which media is capable of partially swelling the specific graft copolymer. Drying of the dispersion signifies the removal of the liquid media by evaporation or volatilization. The films because of the electrical properties of the graft copolymers are very satisfactory for applications requiring thin sections or films having a high electrical insulating value.

While preferred embodiments of the invention have been shown and described, it is to be understood that changes and variations may be made without departing from the spirit and scope of the invention as defined in the appended claims.

I claim:

1. As an article of manufacture, a free-flowing, particulate, sand-like graft copolymer of crystalline cellulose having a level-off D.P. and a copolymerizable monomer containing a doubly bonded methylene group, the graft copolymer being further characterized in forming a translucent film by drying a dispersion of the graft copolymer in a non-solvent liquid media which media is capable of partially swelling the graft copolymer.

2. As an article of manufacture, a free-flowing, particulate, sand-like graft copolymer of reduced crystalline cellulose having a level-off D.P. and a copolymerizable monomer containing a doubly bonded methylene group, the graft copolymer being further characterized in forming a translucent film by drying a dispersion of the graft copolymer in a non-solvent liquid media which media is capable of partially swelling the graft copolymer.

3. As an article of manufacture, a free-flowing, particulate, sand-like graft copolymer of oxidized crystalline cellulose having a level-off D.P. and a copolymerizable monomer containing a doubly bonded methylene group, the graft copolymer being further characterized in forming a translucent film by drying a dispersion of the graft copolymer in a non-solvent liquid media which media is capable of partially swelling the graft copolymer.

4. An article of manufacture as defined in claim 1 wherein the crystalline cellulose constitutes from 15% to 65% by weight of the graft copolymer.

5. An article of manufacture as defined in claim 1 wherein the crystalline cellulose constitutes from 15% to 65% by weight of the graft copolymer and the monomer contains a vinyl group.

6. An article of manufacture as defined in claim 1 wherein the crystalline cellulose constitutes from 15% to 65% by weight of the graft copolymer and the monomer contains a vinylidene group.

7. An article of manufacture as defined in claim 1 wherein the crystalline cellulose constitutes from 15% to 65% by weight of the graft copolymer and the monomer is an acrylic compound.

8. An article of manufacture as defined in claim 1 wherein the crystalline cellulose constitutes from 15% to 65% by weight of the graft copolymer and the monomer is acrylonitrile.

9. A shaped electrically insulating structure formed of a graft copolymer of crystalline cellulose having a level-off D.P. and a copolymerizable monomer containing a doubly bonded methylene group, the crystalline cellulose constituting from 15% to 65% by weight of the graft copolymer, the shaped structure having a dielectric constant of less than 10 and a dissipation factor of less than 0.05 at a relative humidity of up to 100%.

10. A shaped electrically insulating structure as defined in claim 9 wherein the monomer is an acrylic compound.

11. A shaped electrically insulating structure as defined in claim 9 wherein the monomer is acrylonitrile.

12. A transparent slightly translucent film formed of a graft copolymer of crystalline cellulose having a level-off D.P. and a copolymerizable monomer containing a doubly bonded methylene group.

13. A film as defined in claim 12 wherein the monomer is an acrylic compound.

14. A film as defined in claim 12 wherein the monomer is acrylonitrile.

References Cited

UNITED STATES PATENTS

| | | | |
|---|---|---|---|
| 2,922,768 | 1/1960 | Mino et al. | 260—17.4 |
| 2,978,446 | 4/1961 | Battista et al. | 260—212 |
| 3,008,920 | 11/1961 | Vrchik | 260—17.4 |

OTHER REFERENCES

Battista, Ind. & Eng. Chem., vol. 42, No. 3, March 1950 (pp. 502–507) (copy in Scientific Lib.).

WILLIAM H. SHORT, *Primary Examiner.*

J. NORRIS, *Assistant Examiner.*